(12) United States Patent (10) Patent No.: US 8,989,161 B2
Kim et al. (45) Date of Patent: Mar. 24, 2015

(54) METHODS FOR TRANSMITTING A FRAME IN A MULTI-USER BASED WIRELESS COMMUNICATION SYSTEM

(75) Inventors: Yun-Joo Kim, Suwon-si (KR); Jae-Seung Lee, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/478,069

(22) Filed: May 22, 2012

(65) Prior Publication Data
US 2012/0230242 A1 Sep. 13, 2012

Related U.S. Application Data

(63) Continuation of application No. PCT/KR2010/008351, filed on Nov. 24, 2010.

(30) Foreign Application Priority Data

Nov. 24, 2009 (KR) .................. 10-2009-0113869
Mar. 12, 2010 (KR) .................. 10-2010-0022525

(51) Int. Cl.
*H04B 7/04* (2006.01)
*H04W 4/08* (2009.01)
*H04W 8/18* (2009.01)

(52) U.S. Cl.
CPC ............. *H04B 7/0452* (2013.01); *H04W 4/08* (2013.01); *H04W 8/186* (2013.01)
USPC .......................................... 370/338; 370/349

(58) Field of Classification Search
CPC ....... H04B 7/0452; H04W 8/186; H04W 4/08
USPC ......... 370/241, 252, 253, 310, 312, 315, 316, 370/326, 328, 329, 335, 336, 338, 345, 349, 370/351, 389, 395.1, 395.4
See application file for complete search history.

(56) References Cited

U.S. PATENT DOCUMENTS 6,529,882 B1  3/2003  Park et al.
7,352,718 B1  4/2008  Perahia et al.
(Continued)

FOREIGN PATENT DOCUMENTS

EP      2 019 506 A2    1/2009
JP      2003-134139 A   5/2003
(Continued)

OTHER PUBLICATIONS

Hrishikesh Gossain et al., "Supporting MAC Layer Multicast in IEEE 802.11 based MANETs: Issues and Solutions", Proceedings of the 29th Annual IEEE International Conference on Local Computer Networks, 2004, IEEE Computer Society.
(Continued)

*Primary Examiner* — Obaidul Huq

(57) ABSTRACT

The present invention relates to methods for transmitting a frame by grouping a plurality of wireless terminals in a multiuser based wireless communication system. The present invention includes a method for transmitting a frame by including information about multiple receiver terminals in a MAC frame, another method for transmitting a frame by allocating group addresses and then using a corresponding group address for frame transmission, and yet another method for transmitting a frame by using a unique group sequence number that is allocated to each group and group control information that contains bitmap information. The group control information is included in a destination address field of a MAC layer, or in a signal field of a physical layer, or in both the MAC layer and the physical layer.

13 Claims, 7 Drawing Sheets

(56) References Cited

U.S. PATENT DOCUMENTS

| | | | |
|---|---|---|---|
| 7,701,920 | B2 | 4/2010 | Takano |
| 2005/0141420 | A1 | 6/2005 | Li et al. |
| 2005/0147023 | A1 | 7/2005 | Stephens et al. |
| 2005/0233776 | A1 | 10/2005 | Allen et al. |
| 2006/0078001 | A1* | 4/2006 | Chandra et al. ............... 370/473 |
| 2006/0252443 | A1 | 11/2006 | Sammour et al. |
| 2007/0127478 | A1 | 6/2007 | Jokela et al. |
| 2007/0147284 | A1* | 6/2007 | Sammour et al. ............ 370/328 |
| 2007/0263528 | A1 | 11/2007 | Mukherjee |
| 2008/0002636 | A1 | 1/2008 | Gaur et al. |
| 2008/0062178 | A1* | 3/2008 | Khandekar et al. ........... 345/440 |
| 2008/0181161 | A1 | 7/2008 | Gi Kim et al. |
| 2009/0040990 | A1 | 2/2009 | Xhafa et al. |
| 2009/0059792 | A1 | 3/2009 | Itoh |
| 2009/0141726 | A1* | 6/2009 | Fang et al. .................... 370/394 |
| 2009/0154418 | A1 | 6/2009 | Kang et al. |
| 2009/0296619 | A1* | 12/2009 | Sammour et al. ............ 370/311 |
| 2010/0067409 | A1 | 3/2010 | Takano |
| 2011/0103280 | A1* | 5/2011 | Liu et al. ....................... 370/311 |
| 2012/0120931 | A1* | 5/2012 | Abraham et al. ............. 370/338 |
| 2012/0163483 | A1 | 6/2012 | Stacey et al. |
| 2013/0157578 | A1 | 6/2013 | Nanda et al. |

FOREIGN PATENT DOCUMENTS

| | | | |
|---|---|---|---|
| JP | 2005-229448 | A | 8/2005 |
| JP | 2007-214856 | A | 8/2007 |
| JP | 2007-286922 | A | 11/2007 |
| JP | 2008-517518 | A | 5/2008 |
| JP | 2008-278455 | A | 11/2008 |
| JP | 2008-539665 | A | 11/2008 |
| JP | 2009-528745 | A | 8/2009 |
| KR | 1020010045237 | A | 6/2001 |
| KR | 1020020079793 | A | 10/2002 |
| KR | 10-2005-0059304 | A | 6/2005 |
| KR | 10-2006-0045799 | A | 5/2006 |
| KR | 1020060081329 | A | 7/2006 |
| KR | 1020090012199 | A | 2/2009 |
| KR | 1020100050633 | A | 5/2010 |
| WO | WO 2006/043773 | A2 | 4/2006 |
| WO | WO 2006/115999 | A2 | 11/2006 |
| WO | WO 2007/099436 | A2 | 9/2007 |
| WO | WO 2008/080279 | A1 | 7/2008 |
| WO | WO 2009/114379 | A1 | 9/2009 |
| WO | WO 2011/056790 | A1 | 5/2011 |
| WO | WO 2011/057009 | A2 | 5/2011 |

OTHER PUBLICATIONS

International Search Report for PCT/KR2010/008355 filed on Nov. 24, 2010.

Xiaoli Wang et al., "Supporting MAC Layer Multicast in IEEE 802.11n: Issues and Solutions", IEEE Communications Society, WCNC 2009 proceedings, 2009, IEEE.

International Search Report for PCT/KR2010/008351 filed on Nov. 24, 2010.

Chi-Hsiang Yeh, "Media Access Control for Real-time Communications in Consumer Electronics Networks", International Conference on New Trends in Information and Service Science, 2009, pp. 715-718, IEEE.

James Gross et al., "Dynamic Multi-user OFDM for 802.11 systems", Jul. 15, 2007, IEEE, Berlin.

Mohamed Kamoun et al., "Efficient backward compatible allocation mechanism for multi-user CSMA/CA schemes", 2009, IEEE.

European Search Report for Application No. EP 10 83 3555 of Oct. 10, 2012.

International Search Report for PCT/KR2010/008361 filed on Nov. 24, 2010.

Office Action and List of References cited by the Examiner for Application No. 13/479,165 mailed Oct. 2, 2012 from the United States Patent and Trademark Office.

Office Action and List of References cited by examiner for U.S. Appl. No. 13/479,165 mailed Mar. 6, 2013 from the United States Patent and Trademark Office.

Sameer Vermani et al., "Frame Format for GroupID Management", IEEE 802.11- 10/1288r1, Nov. 8, 2010, pp. 1-7.

Joonsuk Kim et al., "GroupID in VHT-SIG Field", IEEE 802.11-10/0582r0, May 17, 2010, pp. 1-5.

Joonsuk Kim et al., "GroupID Concept for Downlink MU-MIMO Transmission", IEEE 802.11-10/0073r0, Jan. 18, 2010, pp. 1-8.

* cited by examiner

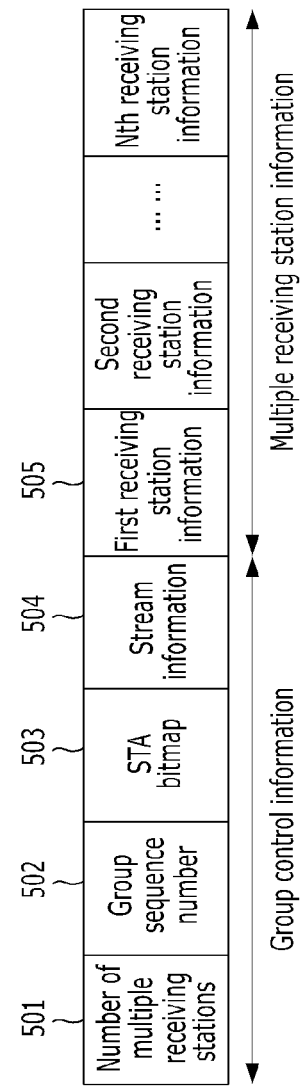

METHODS FOR TRANSMITTING A FRAME IN A MULTI-USER BASED WIRELESS COMMUNICATION SYSTEM

TECHNICAL FIELD

Exemplary embodiments of the present invention relate a method for transmitting a frame by grouping a plurality of wireless stations; and, more particularly, to a method for transmitting a frame to improve transmission efficiency for grouping a plurality of wireless stations in a Multi-User Multiple Input Multiple Output (MU-MIMO) based wireless communication system.

BACKGROUND ART

A wireless local area network (WLAN) basically supports an access point (AP) in a distributed system (DS) and a basic service set (BSS) including a plurality of wireless stations, which are not an access point.

A Medium Access Control (MAC) protocol of a WLAN operates based on a Carrier Sense Multiple Access/Collision Avoidance (CSMA/CA). Accordingly, the WLAN disadvantageously wastes resources in channel contention. In order to overcome such a problem, an enhanced MAC protocol defined in IEEE 802.11a introduced a burst transmission scheme. In the burst transmission scheme, multiple MPDUs are transmitted at an interval of Short Inter-Frame Space (SIFS) during a Transmission Opportunity (TXOP) time after obtaining a transmission right of a wireless resource and ACKs are received in response to the transmitted MPDUs.

Further, Aggregated MSDU (A-MSDU) and Aggregated MPDU (A-MPDU) are defined in IEEE 802.11n. More than one MSDUs are tied together without an Inter Frame Space (IFS) and transmitted using one time wireless resource through contention.

Lately, WLAN users have been abruptly increased. IEEE 802.11 ac has been standardizing a Very High Throughput (VHT) WLAN system in order to increase data throughput provided by one BSS.

A VHT WLAN system supports, in a multiple (three)-STA environment consisting of one AP and two STAs, maximum throughput of 1 Gbps at the MAC SAP of the AP, as well as maximum throughput of 500 Mbps at the MAC SAP of a wireless STA for point-to-point environments. There is also consideration made so that each AP and STA of the VHT WLAN simultaneously supports compatibility with existing WLAN (IEEE 802.11a/n system).

Meanwhile, when a wireless STA acquires a TXOP in a wireless communication system (e.g. WLAN), the STA needs to receive a response through a response frame regarding a request frame in order to improve reliability of wireless communication. For example, frames requiring responses include a RTS (Request-To-Send) frame, a BAR (Block ACK Request) frame, a data frame, and frames for various requests (e.g. probe request, authentication request, association request). Response frames responding to the frames requiring responses are as follows: a response frame responding to a RTS frame is a CTS (Clear-To-Send) frame; a response frame responding to a BAR frame is a BA (Block ACK) frame; a response frame responding to a data frame is an ACK or BA frame; and response frames responding to various request frames are frames of various responses (e.g. probe response, authentication response, association response).

The responses are classified into immediate responses and delayed responses. Responses (ACK frames) to a single piece of data correspond to the immediate responses; and block responses responding to a continuous transmission or aggregated MPDU correspond to both immediate and delayed responses.

An immediate response is used in the following manner: when PHY-RXEND.primitive of a received request frame is generated, a response frame is transmitted after SIFS so that other wireless STAs do not transmit. In this case, the frame exchange sequence constitutes a pair, as described above. The generated response frame may not include a transmission address.

On the other hand, a delayed response is used in the following manner: a response is made through an ACK frame as a basic response for informing of whether an initially generated request frame has been received or not, and a response frame including requested information is then transmitted. The response frame in this case may be transmitted through EDCA (Enhanced Distributed Channel Access) regarding channels, piggybacked by another frame, or aggregated and transmitted together with another frame. According to the delayed response scheme, a transmitting STA receives a response frame from a receiving STA and then informs the receiving STA that the response frame has been received using an ACK frame.

The request and response frame exchange sequence in such a WLAN may be applied to a multiple user wireless communication system. When uplink MU-MIMO technology is supported, wireless STAs can receive frames according to the above-mentioned frame exchange sequence and simultaneously transmit response frames after IFS.

When uplink MU-MIMO technology is not supported, or when better throughput is desired even if uplink MU-MIMO technology is supported, a wireless STA, after receiving a frame, needs to transmit a response frame using a difference of channel or time.

Schemes for exchanging frames using a difference of time but the same bandwidth in a WLAN system include a scheme of exchanging a request frame eliciting response frames and a response frame through channel access for each wireless STA, and a scheme of transmitting, by a plurality of wireless STAs, subsequent response frames through a single request frame.

To be specific, the scheme of exchanging a request frame eliciting response frames and a response frame through channel access for each wireless STA is as follows: an AP transmits a request frame to a first wireless STA through channel access; the first wireless STA transmit a response frame after SIFS; the AP transmits another request frame to a second wireless STA through channel access; and the second wireless STA transmits a response frame after SIFS.

The scheme of transmitting, by a plurality of wireless STAs, subsequent response frames through a single request frame is as follows: a single request frame including address information regarding multiple users is transmitted through channel access, and the wireless STAs then subsequently transmit response frames after SIFS.

IEEE 802.11 standards recommend that, in order to avoid collision between frames on a wireless path, control frames are transmitted to be receivable by all STAs belonging to the corresponding BSS. In a MU-MIMO-based VHT WLAN system, control frames need to be transmitted to be receivable by all STAs, even if a plurality of communication paths are used. The control frames in this connection include RTS, CTS, ACK, BAR, BA, and various poll frames.

When a plurality of communication paths are used simultaneously, STAs receiving control frames may have one-to-one correspondence to respective communication paths, meaning that that a control frame must be transmitted through each communication path. However, this increases the rate of overhead concerning transmission/reception of control frames, degrading the advantage of using MU-MIMO technology.

DISCLOSURE

Technical Problem

An embodiment of the present invention is directed to a method of transmitting a frame by grouping a plurality of wireless stations in order to effectively transmit a control frame and a data frame in a wireless communication system using a multi-user multiple input multiple output (MU-MIMO) technology.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with an embodiment of the present invention, a method for transmitting a frame to wireless stations in a wireless communication system using a multi-user multiple input multiple output technology, includes: transmitting a group address registration request frame for grouping the plurality of wireless stations; grouping the plurality of wireless stations by receiving a group address registration response frame in response to the group address registration request frame; and transmitting a frame including the group address and receiving a response frame in response to the frame.

The response frame for the frame including the group address may be sequentially received from each wireless station.

The group address request frame may include a group address, group data QoS information, and group configuration information of wireless stations forming a group.

The group configuration information may include addresses of the wireless stations forming a group, and addresses of the wireless stations are a MAC address or an association identifier (ID).

In accordance with another embodiment of the present invention, a method for transmitting a frame to wireless stations in a wireless communication system using a multi-user multiple input multiple output technology, includes: transmitting a group control frame including group control information for grouping the plurality of wireless stations; grouping the plurality of wireless stations by receiving a response frame for the group control frame; and transmitting a frame including the group control information and receiving a response frame to the frame.

The group control frame may include at least one of a group sequence number uniquely assigned to each group, bitmap information denoting whether each one of wireless stations of a group receive a frame or not, and stream information related to multiple antennas. The group control frame may further include receiving station information corresponding to a number of wireless stations forming a group.

The group control frame may further include receiving station information corresponding to a number of wireless stations forming a group and information on the number of wireless stations forming the group.

The method may further include updating the group control information according to network configuration information such as connection/cancelation or channel information received from each wireless station.

The updated group control information may be included in a CTS-to-Self frame and transmitted.

The updated group control information may be included in a control frame of a MAC level, which can be decoded by all wireless stations including a legacy wireless station.

The updated group control information includes information on whether a wireless station receives at least one group information and stream information related to multiple antennas and is transmitted to each wireless station as a management frame form through a broadcasting scheme or a unicast scheme.

Advantageous Effects

In accordance with an embodiment of the present invention, a plurality of wireless stations are grouped by allocating a unique group address or a group sequence number through negotiation of a plurality of wireless stations, and frames are transmitted to a plurality of wireless stations using the group address or the group sequence number. Accordingly, frame transmission efficiency is significantly improved in a MU-MIMO system.

BRIEF DESCRIPTION OF THE DRAWINGS

FIG. 1 is a diagram illustrating a MAC frame format where a first embodiment of the present invention is applied to.

FIG. 4 is a diagram illustrating grouping information included in a group address registration request frame in accordance with a second embodiment of the present invention.

FIG. 5 is a diagram illustrating a format of a group control frame in accordance with a third embodiment of the present invention.

BEST MODE FOR THE INVENTION

Figure 1:
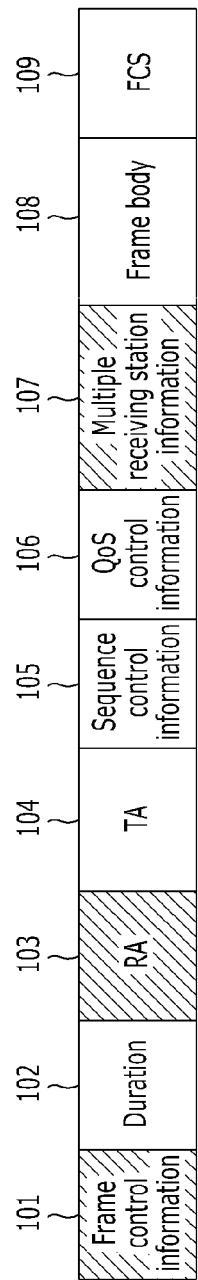

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, a Multi-User Multiple Input Multiple Output (MU-MIMO) wireless communication system in accordance with an embodiment of the present invention is described based on an IEEE 802.11 wireless communication system among various wireless communication systems. However, the present invention is not limited thereto. Embodiments of the present invention may be applied to all wireless communication environments using the MU-MIMO technology.

A frame transferred using the MU-MIMO technology must have information on receiving stations of multiple users. As a method for including information on multiple receiving stations in a frame, the present invention introduces a method for including a list of addresses of multiple users in a transmitted frame as a first embodiment, a method for including a group address inside a transmitted frame as a second embodiment, and a method of including group control information including on a group sequence number and a bitmap inside a transmitted frame as a third embodiment. Here, the group sequence number and the bitmap are information for determine whether a group or a wireless station receives a corresponding frame or not.

At first, a method for including a list of addresses of multiple users in a transmitted frame will be described as a first embodiment of the present invention.

FIG. 1 is a diagram illustrating a MAC frame format whether a first embodiment of the present invention is applied to.

A frame control information field 101 includes a protocol field for receiving a protocol field such as an IEEE 802.11 MAC version, a type and sub-type field for identifying a type of a frame, and various fields for storing various parameters for controlling a frame, such as a ToDS field, a FromDS field, an additional fragment field, a retry field, a power management field, an additional data field, a WEP field, and a sequence field.

A duration field 102 is used as one of frame transmitted during a Network Allocation Vector (NAV) and a Contention Free Period (CFP) and a PS-Poll frame.

A receiving station address (RA) field 103 is a field for storing a receiving destination of a frame, and a transmission station address (TA) field 104 is a field for storing a source transmitting a corresponding frame.

A sequence control information field 105 is used for fragmentation reassembly and dumping overlapped frame. The sequence control information field 105 includes a 4-bit fragment number field and a 12-bit sequence number.

A frame body field 108 is a data field for storing a payload. A Frame Check Sequence (FCS) field 109 is used to check integrity of a frame received from a predetermined station.

Among the fields of the MAC frame, essential fields are the frame control information field 101, the duration field 102, the receiving station address (RA) field 103, and the FCS field 109. The remaining fields may be omitted or added according to a type of a frame in order to save a wireless resource. For example, in case of a data frame not using QoS, a QoS control information field 106 is excluded. Further in case of an IEEE 802.11n dedicated frame, a HT control information field is added with a QoS field to support a HT function.

The frame control information field 101 must be analyzed by all stations in order to inform a type of a received frame. The duration field 102 must be analyzed by all stations to prevent collision between frames on a wireless medium. The receiving station address (RA) field 103 must be analyzed by all stations to confirm whether a destination address of a received frame is an own address or not. If the destination address of the received frame is own address, the receiving station decodes remaining information in a corresponding frame.

Therefore, it is required to include a multiple reception indicator in one of fields that must be analyzed by all stations in order to configure a frame including information on a plurality of receiving stations in one frame. Referring to FIG. 1, as the multiple receiving indicator for indicating that a received frame includes information on a plurality of users, a predetermined bit of the frame control information field 101 or the receiving station address field.

The multiple receiving station information 107 is added after a header including frame control information for sustaining compatibility with a frame of an existing WLAN system. Referring to FIG. 1, the multiple receiving station information 107 is added between the QoS control information field 106 and the frame body 108 or included in the frame body 108 as a predetermined constituent element. Therefore, wireless stations not capable of processing multiple receiving station information detect the multiple receiving station information as a frame body.

Figure 2:
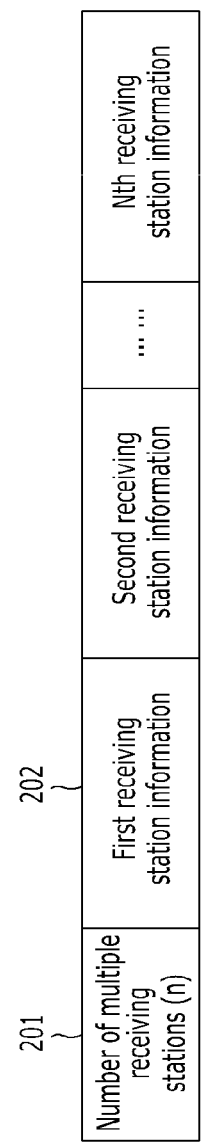
FIG. 2 is a diagram illustrating multiple receiving station information in accordance with a first embodiment of the present invention.

FIG. 2 is a diagram illustrating multiple receiving station information in accordance with an embodiment of the present invention.

As shown in FIG. 2, the multiple receiving station information 107 includes information on the number of receiving stations 201 and information on each receiving station as many as the number of receiving stations. Here, the receiving station information 202 includes information on an address of a receiving station. The receiving station information 202 further includes QoS information and modulation coding scheme (MCS) information selectively.

The multiple receiving station number 201 is a selective element that can be included or not included in the multiple receiving station information. The receiving station address may be a MAC address or an association ID.

Meanwhile, in case of a control frame having a fixed format such as a RTS frame or a BAR frame, an extension format such as a Control Wrapper Frame defined in IEEE 802.11n MAC protocol can be used. If such an extension format is not used, it may be defined as a new control frame and used.

A method of receiving and processing a frame including multiple receiving station information in accordance with an embodiment of the present invention will be described.

At first, a case of using a predetermined bit of frame control information as a multiple receiving indicator will be described.

When a multiple receiving indicator is setup in frame control information, receiving stations addresses are analyzed according to the number of receiving stations. If own address is included in the receiving station addresses, it is determined that a received frame is a frame transmitted to itself. However, if an own address is not in the receiving station addresses, it is determined that the received frame is not a frame transmitted to itself. When the multiple receiving station number information is not included in the received frame, a step of analyzing the multiple receiving station number information may be omitted from a receiving procedure.

Meanwhile, if the multiple receiving indicator is not setup in frame control information, the multiple receiving station information is not included in the received frame. Accordingly, a destination address of a received frame is analyzed. If the destination address is an own address, it is determined that the received frame is a frame transmitted to itself. If not, it is determined that the received frame is not a frame transmitted to itself.

A case of using predetermined destination address information as a multiple receiving indicator will be described.

When destination address information of a received frame is a predetermined value assigned as a multiple receiving indicator, addresses of receiving stations are analyzed according to the number of multiple receiving stations. If an own address is included in receiving station addresses, it is determined that a received frame is a frame transmitted to itself. If not, it is determined that a received frame is not a frame transmitted to itself.

Meanwhile, if the destination address information of a received frame is not the predetermined value assigned as the multiple receiving indicator, it is determined as a typical destination address. Accordingly, if the destination address is an own address, it is determined that a received frame is a frame transmitted to itself. If not, it is determined that the received frame is not a frame transmitted to itself.

In order to transmit a frame using a group address, it is required to group wireless stations in a basic service set (BSS).

Figure 3:
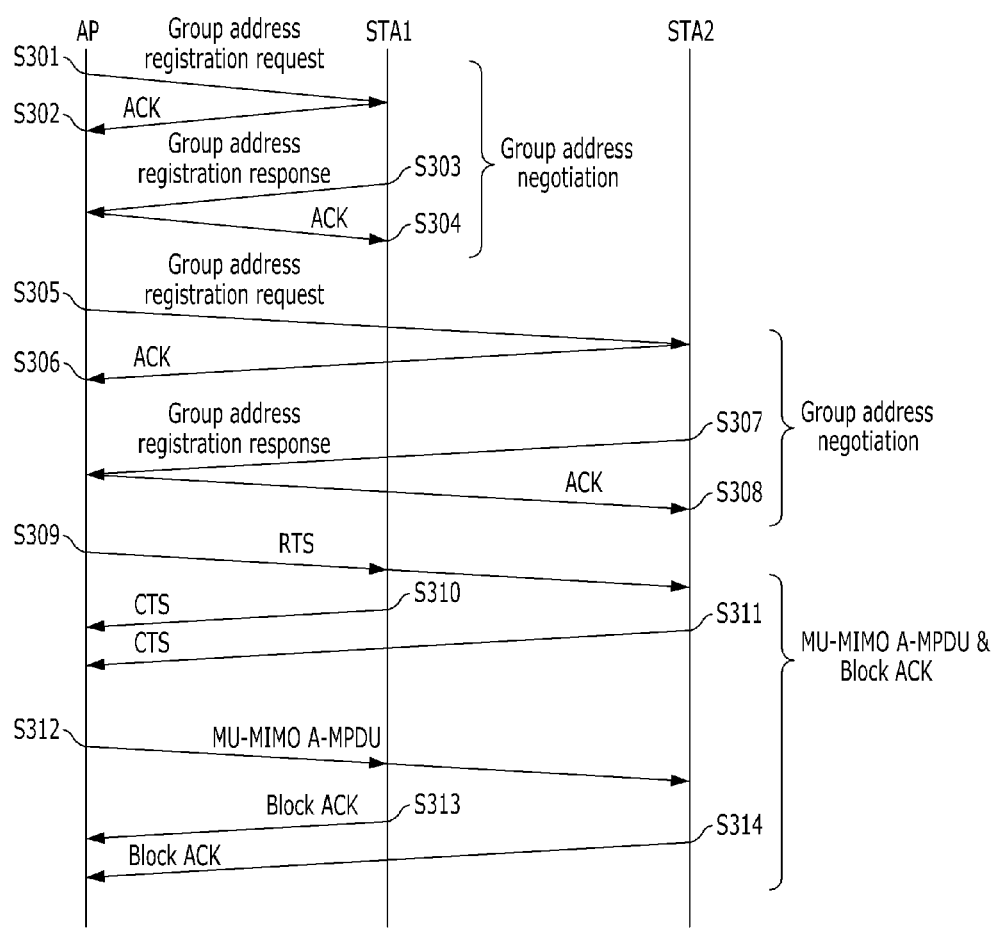
FIG. 3 is a diagram illustrating a frame transmission procedure by allocating a group address and using a group address in accordance with a second embodiment of the present invention.

FIG. 3 is a diagram illustrating a procedure of grouping a plurality of stations and transmitting a frame to grouped stations in accordance with an embodiment of the present invention.

At first, an access point (AP) performs a group address negotiation procedure for negotiating a group address with wireless stations in a basic service set (BSS). Referring to FIG. 3, the access point (AP) performs a group address negotiation procedure with a first wireless station STA1 and performs a group address negotiation procedure with a second wireless station STA2.

As shown in FIG. 4, a frame used for the group address negotiation procedure includes a group address 401, group data QoS information 402, and group configuration information 403. Here, the group configuration information includes information on addresses of stations in a predetermined group and timing information such as a response transmission time in case of a delayed response.

In the group address negotiation procedure, a response frame may be transmitted using an immediate response scheme or a delayed respond scheme. FIG. 3 illustrates a group address negotiation procedure transmitting a response frame using a delayed response scheme. For example, request and response frames for the group address negotiation procedure are transmitted as a management frame.

Although it is not shown in the drawings, a method of transmitting a response frame in response to a group address registration request using an immediate response method will be described.

An access point (AP) transmitting a group address registration request frame transmits a group address registration request frame to a first wireless station. The first wireless station transmits a group address registration response frame in response to the group address registration request frame after a short inter-frame space (SIFS). Continuously, the access point (AP) transmits a group address registration request frame to a second wireless station. The second wireless station transmits a group address registration response frame after a SIFS in response to a group address registration request frame. Through the above described procedure, the access point (AP) transmits a group address registration request frame individually to a plurality of wireless stations and receives a response frame in response to the group address registration request frame. The described procedure may be applied when request and response frames are transmitted as a control frame in a group address negotiation procedure.

Hereinafter, a group address negotiation procedure using a delayed response method will be described with reference to FIG. 3.

At step S301, the access point (AP) transmits a group address registration request frame to a first wireless station STA1. At step S302, the access point (AP) receives an ACK frame from the first wireless station STA1 after a SIFS. At step S303, the first wireless station STA1 performs channel access and transmits a group address registration response frame for the group address registration request to the access point (AP). At step S304, the access point (AP) receives the group address registration response frame and transmits the ACK frame to the first wireless station STA1 after a SIFS.

At step S305, the access point (AP) transmits a group address registration request frame to a second wireless station (STA2). At step S306, the access point (AP) receives an ACK frame from the second wireless station (STA2) after the SIFS. At step S307, the second wireless station (STA2) performs channel access and transmits a group address registration response frame for the group address registration request to the access point (AP). At step S308, the access point (AP) receives the group address registration response frame and transmits an ACK frame to the second wireless station (STA2) after a SIFS.

Through the above described procedure, the access point (AP) performs the group address negotiation procedure for negotiating a group address with a plurality of wireless stations. Here, the group address registration frame may include agreement and refusal to the group address registration request.

At step S309, the access point (AP) transmits a RTS frame to a plurality of wireless stations using a group address after completing grouping a plurality of stations through the group address negotiation procedure. The first and second wireless stations receiving the RTS frame sequentially transmit a CTS frame according to a response time calculated through a transmission MCS of a frame and a response sequence included in the RTS frame at steps S310 and S311.

At step S312, the access point (AP) transmits a data frame in a unit of a MU-MIMO aggregated MPDU (A-MPDU) to grouped wireless stations. At steps S313 and S314, the access point (AP) receives a Block ACK frame each wireless station.

Here, a plurality of group addresses may be allocated to one wireless station. That is, grouped wireless stations may have more than one group address.

Hereinafter, a method of including group control information including on a group sequence number and a bitmap inside a transmitted frame as a third embodiment will be described.

FIG. 5 is a diagram illustrating a group control frame format for negotiating group control information in accordance with an embodiment of the present invention.

The group control information includes the number of multiple receiving stations 501, a group sequence number 502 unequally allocated to one group, STA bitmap information 503 for informing whether a frame is received from wireless stations or not, and stream information 504. The multiple receiving station information 505 includes information on receiving stations corresponding to the number of multiple receiving stations.

The information 501 on the number of the multiple receiving stations shows the number of stations assigned as one group. It is an optional element, not an essential element.

The group sequence number 502 is a unique number for managed by each access point for grouping wireless stations in a basic service set (BSS). For example, the group sequence number 502 may have a six-bit long. If a group number from 1 to 64 can be expressed by combining bitmap information and stream information, a group sequence number may be omitted. In other words, a group unique number may be expressed as a location of more than one group control information combined of bitmap information and stream information. When a group sequence number is used in a transmitted frame, a transmission frame includes group control information such as bitmap information and stream information located at a location matching with a group sequence number.

The STA bitmap information 503 of a wireless station is information denoting whether a frame is received at each receiving station according to a sequence of n receiving station information fields. For example, when bitmap information is "1101" if the number of multiple receiving stations is 4 (n=4), it means that the frame is transmitted to a first wireless station, a second wireless station, a third wireless station, and a fourth wireless station. Accordingly, each receiving station recognizes an own location from a bitmap using an address in a receiving station information field while being allocated with group control information.

Meanwhile, because the number of wireless stations corresponding to a corresponding group sequence number is 1 in case of informing a group sequence number of an own group to one of wireless stations, one-bit information is used to inform whether a frame is received or not as a value of 1 or 0. Also, one station may be included in a plurality of groups. In case of expressing a plurality of groups using a group sequence number, the bitmap information of the wireless station may be used to inform whether a frame is received from a corresponding group.

The stream information 504 is information for denoting a stream location of a transmission antenna in a MU-MIMO environment. That is, the stream information 504 is information denoting which antenna is used to transmit a frame among four antennas. Accordingly, a location of stream to receive at a receiving station can be determined through the stream information. Further, the stream information may include individual information for a streams where a is an integer number. When a streams are classified into b groups, a value b may denote a receiving location.

The receiving station information 505 includes information on an address of a receiving station. The receiving station information 505 further include QoS information and modulation coding scheme (MCS) information as well as receiving station address information. The receiving station address may be one of a MAC address and an association ID.

Such a group control frame may be transmitted to a plurality of wireless stations using a broadcasting method. Also, the group control frame may be transmitted to each wireless station using a unicast method. In case of using the unicast method, a group control frame only includes a group sequence number 502, own bitmap information 503, and stream information 504.

Frames transmitted after completing allocating the group control information for a plurality of wireless stations include only a group sequence number and bitmap information and stream information of a wireless station. Accordingly, each wireless station recognizes a destination of a frame using a group sequence number and bitmap information allocated to itself and receives a signal using stream information.

Meanwhile, one of wireless stations can be allocated with more than one group control information. That is, a group control frame may include bitmap information and stream information of a wireless station corresponding to more than one group sequence number. The same frame format shown in FIG. 5 may be used when a wireless station is allocated with a plurality of group control information.

Figure 6:
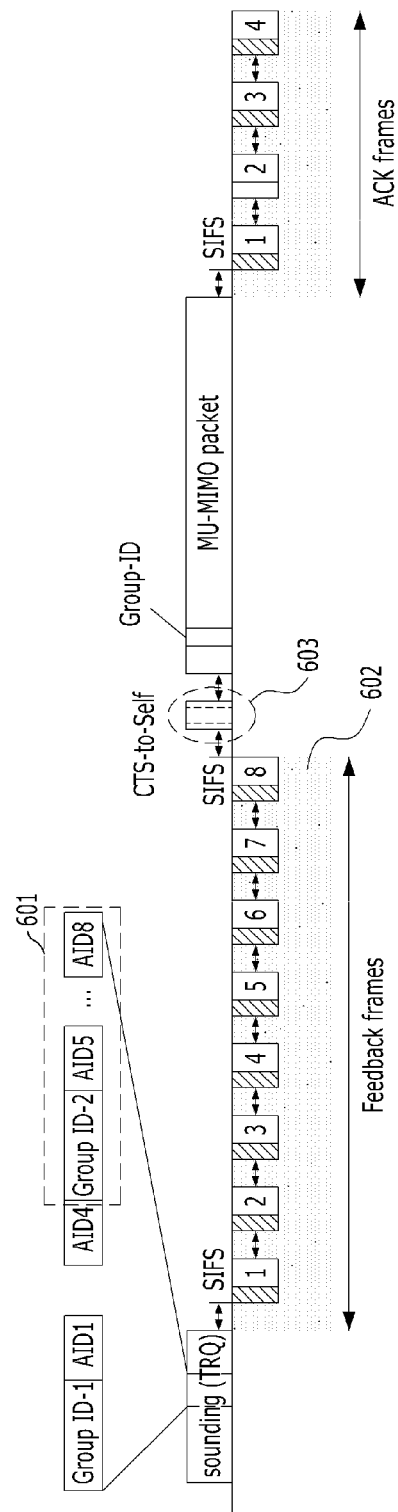
FIG. 6 is a diagram illustrating overall operation of a wireless local area network using a group number in accordance with an embodiment of the present invention.

FIG. 6 is a diagram illustrating overall operation of a wireless local area network (WLAN) using a group number in accordance with an embodiment of the present invention.

The overall operation of a WLAN in case of using a group number includes: defining, negotiating, and allocating a group number, requesting and responding sounding information, transmitting MU-MIMO data, and responding the MU-MIMO data. Here, exchanging of a RTS/CTS frame may be performed at a time of requiring channel protection like prior to sounding or MU-MIMO data transmission step.

Here, if the defining, negotiating, and allocating a group number and the sounding are performed at the same time, a frame transmitted for those steps must have at least one purpose. It may be ineffective in a view of control and loss of operation. Accordingly, it is prefer to perform the group number defining, negotiating, and allocating step and the sounding step independently. In an embodiment of the present invention, the group number defining, negotiating, and allocating step is performed independently from the sounding step when it is required to group a plurality of wireless stations in a basic service set (BSS).

FIG. 6 is a diagram illustrating overall operation of a WLAN system having two groups by assigning one group using association IDs (AID) of four receiving stations.

Referring to FIG. 6, a group number such as a group ID or a group sequence number is defined, a group number is assigned to each station through negotiation or a group number is allocated to each station, and sounding is required using the group number at step S601.

At step S602, each wireless station transmits an ACK frame for the sounding request after a SIFS based on a predetermined schedule, thereby performing feedback to the sounding request.

After receiving the ACK frame for the sounding request from the last wireless station, an access point (AP) transmits a CTS-to-Self frame as a NAV distribution step after a SIFS before transmitting a MU-MIMO data frame at step S603. Here, the CTS-to-Self frame includes group control information updated based on feedback information reduced in a previous sounding step. Here, the group control information is updated according to channel information of each wireless station included in backup information or network configuration information such as connection/connection cancel information.

As described above, the CTS-to-Self frame informs a response sequence to a receiving MAC including wireless stations not participated for receiving, and a wireless station to receive data calculate a transmission time of a response frame using the response sequence information.

After completing NAV distribution, the access point transmits a UM-MIMO data frame including a group number to a plurality of wireless stations and receives a response frame such as an ACK frame in response to the UM-MIMO data frame from each wireless station.

Meanwhile, the updated group control information may be transmitted by being included not only in the CTS-to-Self frame but also in a MAC level control frame that can be included in a legacy wireless station and decoded by all wireless stations. The updated group control information includes information on whether a predetermined wireless station receives more than one different group information and stream information. Such a updated group control information is transmitted as a broadcasting scheme or a unicast scheme as a management frame form.

Transmitting a group control frame to a plurality of wireless stations in a broadcasting scheme will be described.

Stations receiving a group control frame determine that the group control frame is a frame transmitted to own address if a corresponding bit in a bitmap of a wireless station is setup as '1'.

The wireless stations transmit an ACK frame for the group control frame after a SIFS. Here, each wireless station sequentially transmits the ACK frame.

In a method of sequentially performing response at each wireless station in accordance with an embodiment of the present invention, each wireless station transmits an ACK frame after a time calculated by multiplying the number of bits setup as 1 among bits prior to an own bit in a bitmap of a wireless station by the sum of an ACK frame transmission time and a SIFS. In other words, a wireless station transmits an ACK frame after all of wireless stations having 1 as a bit value of a bitmap before its own turn.

Figure 7:
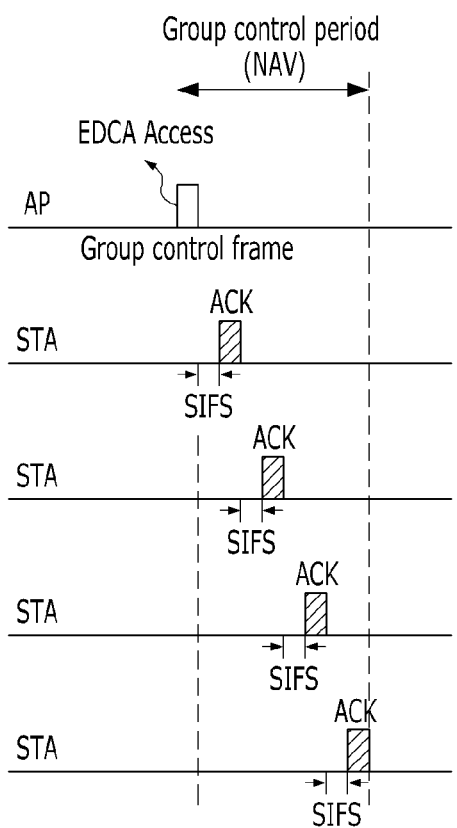
FIG. 7 is a diagram illustrating a method for transmitting a group control information frame in accordance with a third embodiment of the present invention.

FIG. 7 is a diagram illustrating a method for transmitting a group control frame in accordance with an embodiment of the present invention.

Referring to FIG. 7, the number of wireless stations forming a group is 4 and a bitmap is formed of 4-bits. An access point (AP) creates a group control frame including a group sequence number, bitmap information of a wireless station, stream information, and receiving station information. The access point (AP) sets up a NAV protection value in order to safely receive an ACK frame from multiple users formed as four wireless stations.

Referring to FIG. 7, each wireless station transmits an ACK frame at its own turn, thereby performing response to a group control frame. Here, the access point sets up a corresponding bit of a bitmap as '1' for a wireless station performing response at a corresponding turn when the wireless station transmits a MU-MIMO data frame. However, the access point sets up a corresponding bit of a bitmap as '0' for a wireless station not performing response when the wireless transmits a MU-MIMO data frame.

Figure 8:
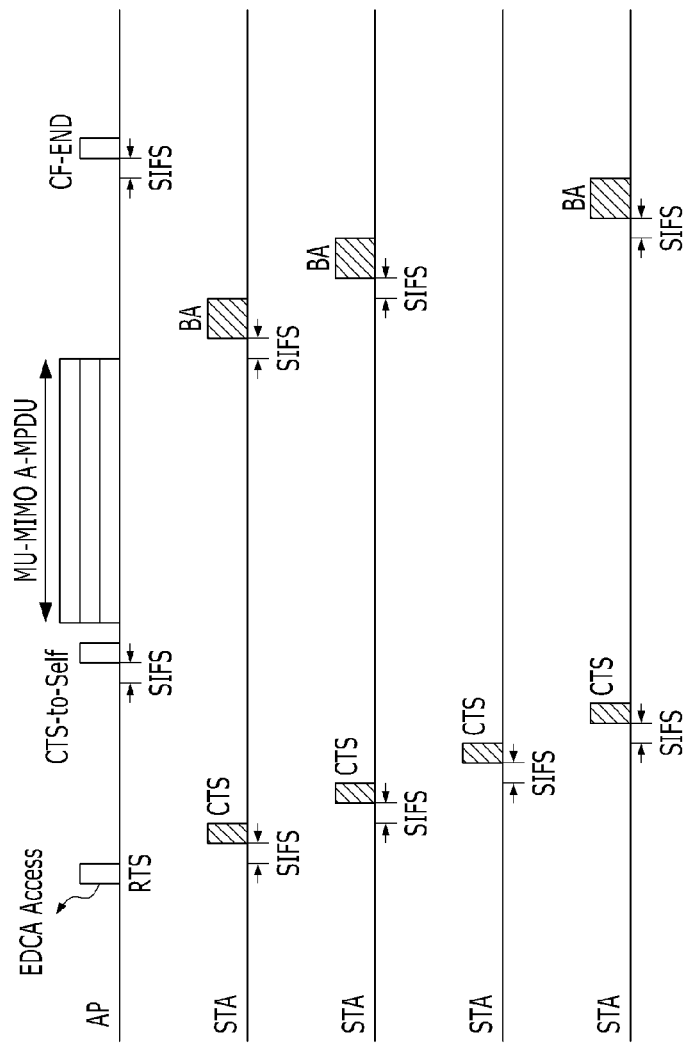
FIG. 8 is a diagram illustrating a frame transmission method in accordance with an embodiment of the present invention.

FIG. 8 is a diagram illustrating a method for transmitting a frame using group control information in accordance with an embodiment of the present invention.

A frame transmission method of a typical WLAN generally includes RTS/CTS/DATA/ACK steps. In case of transmitting a Mu-MIMO data frame, it may include the same steps.

The exchange of a RTS/CTS frame is a function required for a hidden-node problem and for channel protection for a frame longer than a RTS threshold. In case of transmitting data using a MU-MIMO technology, a process of exchanging a RTS/CTS frame is required. Here, a RTS frame includes group control information in a receiving station address field. Here, the group control information includes at least a group sequence number and bitmap information. When the group control information is recorded at the receiving station address field, it is possible to transmit a frame to multiple users without modifying an existing frame format or without adding additional frame.

Wireless stations having the same group sequence number transmit a CTS frame for a RTS frame at an own response turn.

After exchanging the RTS/CTS frame, the access point (AP) transmits the CTS-to-Self frame. The CTS-to-Self frame may include updated group control information.

The access point transmits a MU-MIMO data frame using the updated group control information. Referring to FIG. 8, four wireless stations form a group included in the group control information. After updating group control information, three wireless stations receive a MU-MIMO data frame transmitted using a corresponding group sequence number. That is, a bitmap is configured as '1101' by setting up a bit for the third wireless station as '0' in the bitmap. Accordingly, it is possible to indicate there is no data transmitted to the third wireless station.

Each wireless station sequentially transmits a Block Ack frame for a data frame using the updated group control information included in the CTS-to-Self.

Since MAC addresses of corresponding wireless stations are included in destination addresses of each A-MPDU of the MU-MIMO data frame, data are received from multiple users independently from each beamformed A-MPDU. Here, grouping wireless stations to receive data using MU-MIMO is decided by a combination providing superior throughput when data frames are transmitted at the same time using MU-MIMO and a combination of QoS information of data to be transmitted.

Until now, the frame transmission method when group control information is included in a MAC frame was described. In case of transmitting a frame by including the group control information in a MAC frame, a step of transmitting a CTS-to-Self frame is performed prior to a step of transmitting a MU-MIMO data frame. That is, accurate stream information can be transferred by performing the CTS-to-Self frame transmission step prior to the MU-MIMO data frame transmission step. Accordingly, there is an overhead of a MAC layer generated.

Therefore, an embodiment of the present invention includes a method for including group control information in a physical layer signal field.

Figure 9:
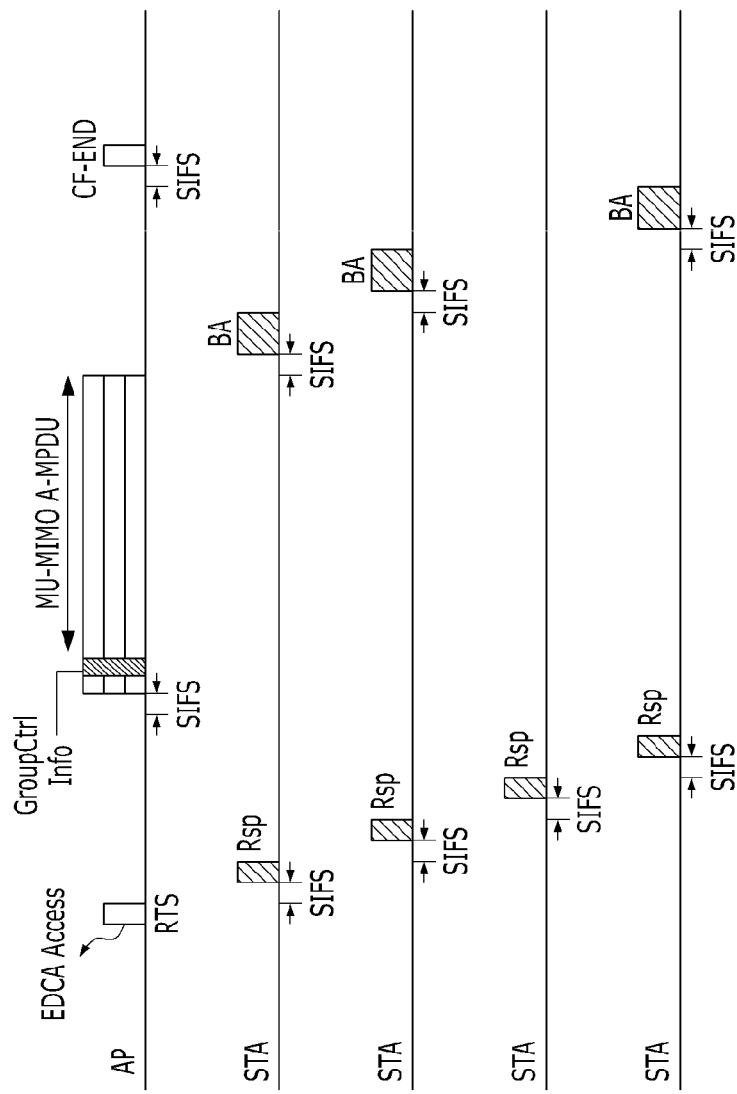
FIG. 9 is a diagram illustrating a frame transmission method when group control information is included in a signal field of a physical layer in accordance with an embodiment of the present invention.

FIG. 9 is a diagram illustrating a frame transmission method when a physical layer signal field includes group control information.

In case of including the group control information in the physical layer signal field, the group control information may include a group sequence number and stream information. Since each receiving station address of a MAC frame includes each receiving station address, bitmap information is not required to be included in the physical layer signal field. In other words, each wireless station grouped using a physical layer signal field determines whether a frame is received or not. When a wireless station determines that a received frame is a frame transmitted to itself, each wireless station confirms a destination address through a MAC frame. Accordingly, it is not required to include bitmap information in a physical layer signal field.

Due to a compatibility problem with a legacy wireless station, group control information cannot be included in a physical layer signal field of a control frame such as a RTS frame, a CTS frame, a BAR frame, and a BA frame sustaining a legacy frame. The group control information may be included in only a physical layer signal field of a MU-MIMO data frame.

Referring to FIG. 9, all of VHT wireless stations decode a physical layer signal field of a MU-MIMO data frame and interrupt a receiving operation when it is not an own group number according to corresponding decoded group control information. However, VHT wireless stations decode only corresponding streams using stream information when it is the own group number.

In FIG. 9, a Req/Rsp frame includes a RTS frame modified for a scheduled CTS frame and a CTS frame which is a response for the modified RTS frame. On the contrary, the Req/Rsp frame includes a sounding request frame including group control information and a channel feedback response frame if the sounding procedure is included.

In case of transmitting a data frame by including group control information in a physical layer signal field, the RTS/CTS step is required to modified. Since legacy wireless stations cannot perform NAV update using beamformed VHT data, a robust channel protection method is required.

Hereinafter, a method for including group control information in a MAC layer and a method for including group control information in a physical layer (PHY).

Meanwhile, a frame can be transmitted by including group control information at both of a MAC layer and a PHY layer. In this case, the group control information is included in the CTS-to-Self frame of a MAC layer, and the group control information is also included in a PHY signal field of a VHT data frame at the same time.

A method of transmitting a frame by including the group control information in the both of the MAC layer and the PHY layer can reduce additional overhead and effectively support compatibility with a legacy wireless station.

For example, an overhead for always transmitting a CTS-to-Self frame prior to a VHT data frame can be reduced because modified group control information can be transferred using a PHY signal field of a VHT data frame. A channel protection function can be supported without modifying a legacy control frame format because a frame is transmitted by including the group control information in a legacy CTS-to-Self frame or a receiving station address field of a legacy RTS frame. That is, a channel protection function can be enhanced, and a transmission time of each multi-response frame can be recognized because the updated group control information is transferred to a MAC layer of a receiving station. Accordingly, each receiving station can further accurately perform a related process.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

Embodiments of the present invention are applied to a MU-MIMO WLAN system that groups a plurality of wireless stations and transmits a frame.

What is claimed is:

1. A method of processing a data frame in a wireless communication system, the method comprising:
receiving, by a receiver, group control information to assign or change a position of the receiver for one or more groups from an access point, the group control information including bitmap information and stream information, the bitmap information indicating whether the receiver is a member of at least one of a plurality of groups; and
receiving, by the receiver, a data frame from the access point after receiving the group control information, the data frame including a group identifier indicating one of the plurality of groups for the receiver to receive at least one spatial stream,
wherein the group identifier indicates a group where the receiver is determined as a member according to the bitmap information,
wherein the stream information indicates at least one spatial stream to be received by the receiver in a multi-user multiple input multiple output environment for the group identified by the group identifier, and
wherein the group control information is received via a medium access control (MAC) frame that is generated by a MAC layer, and the group identifier is included in a physical (PHY) preamble of the data frame that is generated by a PHY layer.

2. The method of claim 1, wherein a number of bits for the group identifier is 6.

3. The method of claim 2, wherein each bit in the bitmap information corresponds to each group.

4. The method of claim 3, wherein if a bit in the bitmap information is set to '1', the receiver is a member of a group corresponding to the bit.

5. The method of claim 1, wherein the group control information includes identification information for at least one receiver.

6. The method of claim 5, wherein the identification information is an association identifier (AID).

7. The method of claim 1, wherein the stream information indicates a number of the at least one spatial stream for the group identified by the group identifier.

8. An apparatus for processing a data frame in a wireless communication system, the apparatus comprising:
a memory; and
a receiver coupled with the memory and configured to:
receive group control information to assign or change a position of the receiver for one or more groups from an access point, the group control information including bitmap information and stream information, the bitmap information indicating whether the receiver is a member of at least one of a plurality of groups; and
receive a data frame from the access point after receiving the group control information, the data frame including a group identifier indicating one of the plurality of groups for the receiver to receive at least one spatial stream,
wherein the group identifier indicates a group where the receiver is determined as a member according to the bitmap information,
wherein the stream information indicates at least one spatial stream to be received by the receiver in a multi-user multiple input multiple output environment for the group identified by the group identifier, and
wherein the group control information is received via a medium access control (MAC) frame that is generated by a MAC layer, and the group identifier is included in a physical (PHY) preamble of the data frame that is generated by a PHY layer.

9. The apparatus of claim 8, wherein a number of bits for the group identifier is 6.

10. The apparatus of claim 9, wherein each bit in the bitmap information corresponds to each of the plurality of groups.

11. The apparatus of claim 10, wherein if a bit in the bitmap information is set to '1', the receiver is a member of a group corresponding to the bit.

12. The apparatus of claim 8, wherein the group control information includes identification information for at least one receiver.

13. The apparatus of claim 12, wherein the identification information is an association identifier (AID).

\* \* \* \* \*